United States Patent

Matsuura

(10) Patent No.: US 7,321,647 B2
(45) Date of Patent: Jan. 22, 2008

(54) CLOCK EXTRACTING CIRCUIT AND CLOCK EXTRACTING METHOD

(75) Inventor: Kouji Matsuura, Chiba (JP)

(73) Assignee: Sony Corporation (JP)

( * ) Notice: Subject to any disclaimer, the term of this patent is extended or adjusted under 35 U.S.C. 154(b) by 743 days.

(21) Appl. No.: 10/784,185

(22) Filed: Feb. 24, 2004

(65) Prior Publication Data

US 2004/0190667 A1 Sep. 30, 2004

(30) Foreign Application Priority Data

Mar. 24, 2003 (JP) ............................. P2003-079706

(51) Int. Cl.
*H04L 7/00* (2006.01)
(52) U.S. Cl. ...................... 375/355; 375/360
(58) Field of Classification Search ................ 375/326, 375/354, 355, 371, 373, 360
See application file for complete search history.

(56) References Cited

U.S. PATENT DOCUMENTS 5,504,751 A * 4/1996 Ledzius et al. ............. 341/144

7,133,482 B2 * 11/2006 Poletto et al. ............... 375/361

FOREIGN PATENT DOCUMENTS

JP 2001-148692 5/2001

* cited by examiner

*Primary Examiner*—Young T. Tse
(74) *Attorney, Agent, or Firm*—Rader Fishman & Grauer PLLC; Ronald P. Kananen

(57) ABSTRACT

In a clock extracting circuit according to the present invention, after serial data is subjected to oversampling using a reference clock of 2N times a frequency of the serial data, clock timing in a period of time in which signal level remains unchanged for a long duration is extracted. Clock timing based on a point of change in the signal level is also extracted, and a final clock timing signal is outputted according to these timings detected. Thus, clock timing can be extracted accurately without omission even when the input signal includes jitter. Further, the clock extraction is performed without converting the input signal into parallel data and by simple processing. A clock extracting circuit for extracting a clock signal from the received serial data with high accuracy is thus realized without increasing the circuit scale.

7 Claims, 6 Drawing Sheets

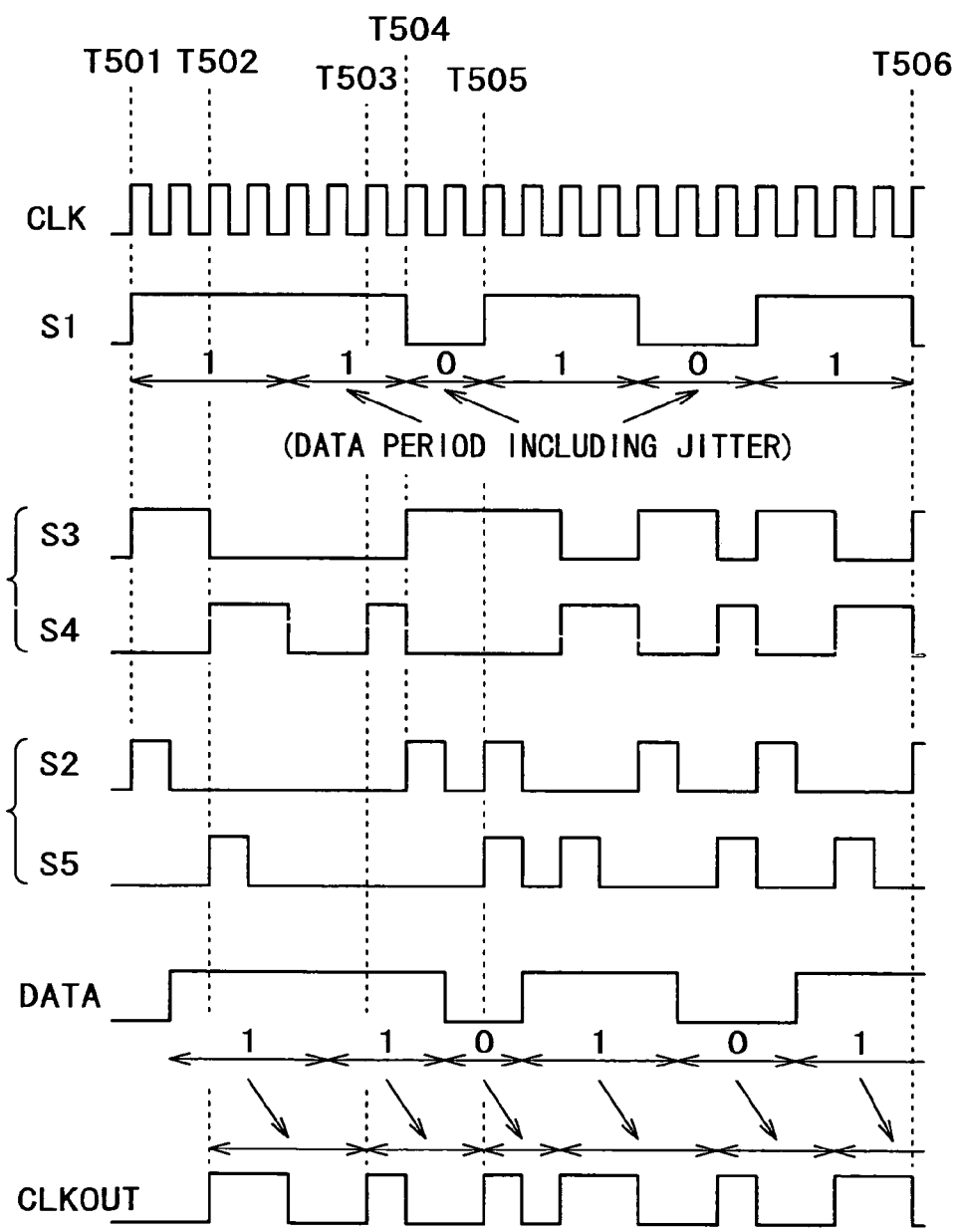
F I G. 5

US 7,321,647 B2

CLOCK EXTRACTING CIRCUIT AND CLOCK EXTRACTING METHOD

BACKGROUND OF THE INVENTION

The present invention relates to a clock extracting circuit and a clock extracting method for extracting a clock signal synchronous with input NRZ type serial data from the serial data.

Recently, there has been an increasing demand for high-speed transfer of a large amount of data, and attention has been directed to serial data interfaces that realize a transfer speed of a few hundred Mbps or 1 Gbps or more. In such interface technology, only data that does not include a clock signal component is transmitted, and the data is received on a receiving side by generating a clock signal in synchronism with the input data by a phase-locked loop (PLL) circuit and latching the input data using the generated clock signal.

Such interface technology conventionally uses, for example, a clock extracting device that performs predetermined times oversampling on the basis of a clock signal from a PLL circuit, develops the input data into parallel data, and then extracts a clock signal (see Patent Document 1, for example).

FIG. 6 is a diagram showing an example of a configuration of the conventional clock extracting device.

The clock extracting device shown in FIG. 6 has a sampling circuit 110, data converting units 120, 130, and 140, and a serializer 150. Each block is supplied with a 12-phase clock signal CLK from a PLL circuit not shown in the figure.

A serial NRZ (Non-Return-to-Zero) signal from a transmission line is inputted to the sampling circuit 110. The sampling circuit 110 quantizes each unit of consecutive four pieces of data of the input signal by performing three times oversampling in response to a rising edge of the 12-phase clock signal CLK and thereby generates a first data string developed into parallel data in units of 12 bits.

The data converting unit 120 performs EXOR processing on bits adjacent to each other in the first data string obtained by the sampling circuit 110 and thereby generates a second data string for determining change points in the first data string. The data converting unit 130 refers to a third bit from each change point in the second data string generated by the data converting unit 120 as well as bits preceding and succeeding the third bit and generates a third data string in which when the bits preceding and succeeding the third bit are not change points, the third bit referred to is set as a boundary point, and when the preceding or succeeding bit is a change point, the bit as the change point is set as a boundary point.

The data converting unit 140 generates a clock bit string on the basis of the boundary points in the third data string. Then, the serializer 150 converts the clock bit string from the data converting unit 140 from 12-bit parallel data to 1-bit serial data, whereby a clock signal CLKOUT is extracted.

[Patent Document 1]
Japanese Patent Laid-Open No. 2001-148692 (paragraph numbers [0021] to [0030], FIG. 12)

However, in the case of the clock extracting device that performs data processing after developing serial data into parallel data as described above, the larger a number of bits of parallel data, the larger a scale of hardware. It is therefore difficult to increase an oversampling multiple and enhance the accuracy of clock signal extraction. In addition, with an increase in the speed of data transfer, a PLL circuit is required which can output a multiphase clock having phases shifted more accurately to circuits that process each bit of the parallel data. Thus, when the clock extracting device is applied to a receiving circuit for receiving data transmitted at even an higher speed, especially in the future, circuit scale and power consumption will be increased, and it will not be easy to maintain accuracy.

SUMMARY OF THE INVENTION

It is accordingly an object of the present invention to provide a clock extracting circuit capable of accurately extracting a clock signal from received serial data without increasing the circuit scale.

It is another object of the present invention to provide a clock extracting method capable of accurately extracting a clock signal from received serial data without increasing the circuit scale.

In order to solve the above problems, according to the present invention, there is provided a clock extracting circuit for extracting a clock signal synchronous with input NRZ type serial data from the serial data, the clock extracting circuit including: oversampling means for oversampling the serial data using a reference clock signal of 2N (where N is an integer of two or more) times a frequency of the serial data; first timing detecting means for detecting the timing of 2N periods of the reference clock signal in a period of time in which the level of an output signal from the oversampling means remains unchanged; second timing detecting means for detecting the timing of change in the level of the output signal from the oversampling means; and clock timing signal outputting means for outputting a clock timing signal according to the timings detected by the first timing detecting means and the second timing detecting means.

In such a clock extracting circuit, the oversampling means subjects the input serial data to oversampling using the reference clock of 2N times the frequency of the serial data. The first timing detecting means detects a timing of 2N periods of the reference clock signal in a period of time in which the level of the signal after the oversampling remains unchanged and thereby extracts clock timing in the period of time in which the signal level remains unchanged for a long duration. The second timing detecting means detects a timing of change in the level of the signal after the oversampling and thereby extracts clock timing based on the point of change in the signal level. The clock timing signal outputting means outputs a final clock timing signal according to the timings detected by the first timing detecting means and the second timing detecting means.

Further, according to the present invention, there is provided a clock extracting method for extracting a clock signal synchronous with input NRZ type serial data from the serial data, the clock extracting method including the steps of: oversampling the serial data using a reference clock signal of 2N (where N is an integer of two or more) times a frequency of the serial data; and generating a clock timing signal according to the timing of 2N periods of the reference clock signal, the timing being detected in a period of time in which the level of a signal generated by the oversampling remains unchanged, and timing the change in the level of the signal generated by the oversampling.

In such a clock extracting method, the input serial data is subjected to oversampling using the reference clock of 2N times the frequency of the serial data. The timing of 2N periods of the reference clock signal is detected in a period of time in which the level of the signal after the oversampling remains unchanged, whereby clock timing in the period of time in which the signal level remains unchanged for a long duration is extracted. Further, the timing of change in the level of the signal after the oversampling is detected, whereby clock timing based on the point of change in the signal level is extracted. Then, a final clock timing signal is generated according to these two detected timings.

BRIEF DESCRIPTION OF THE DRAWINGS

FIG. 5 is a timing chart showing waveforms of output signals from parts within the clock extracting circuit.

DETAILED DESCRIPTION OF THE PREFERRED EMBODIMENT

A preferred embodiment of the present invention will hereinafter be described with reference to the drawings.

Figure 1:
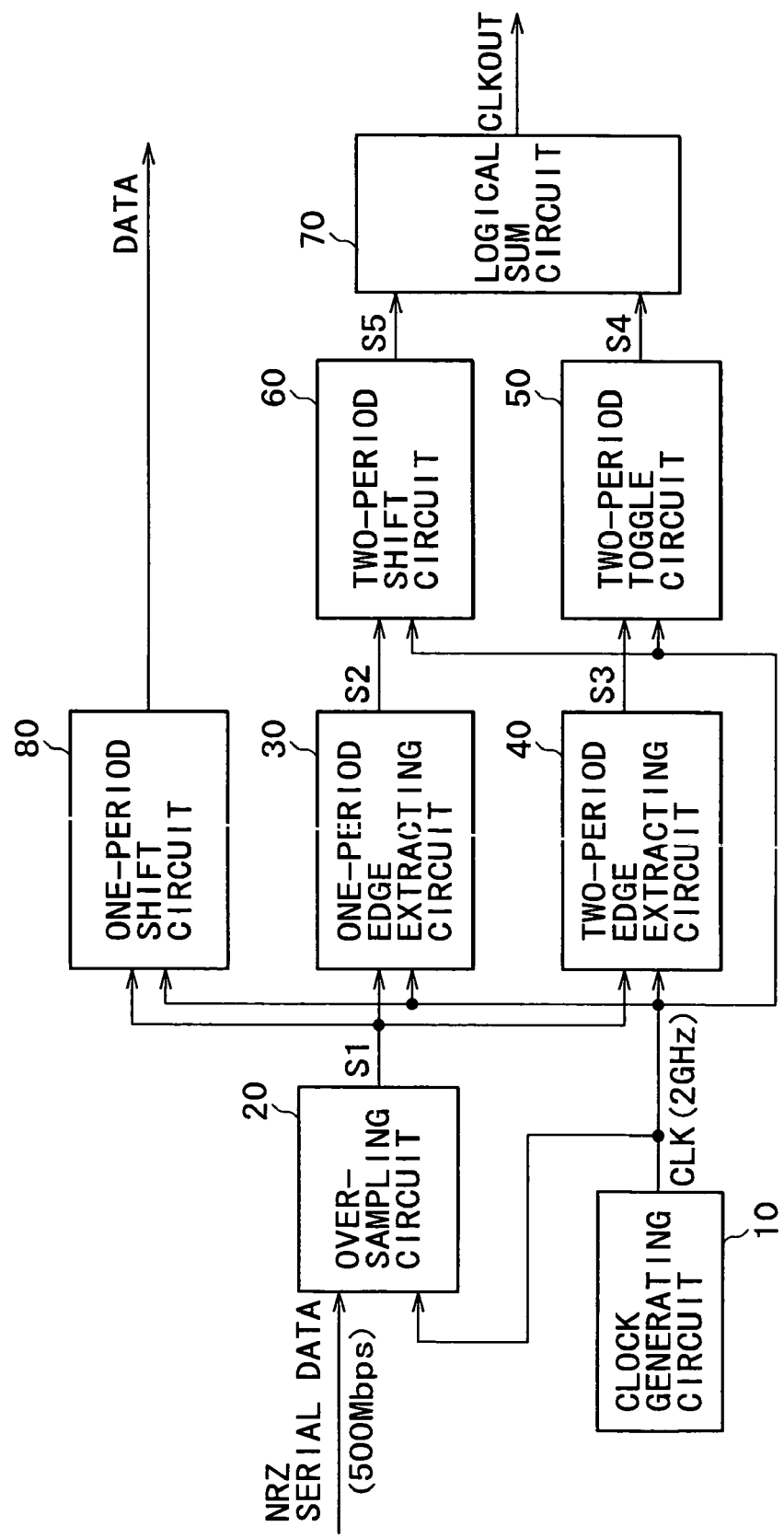
FIG. 1 is a block diagram showing an example of a general configuration of a clock extracting circuit according to an embodiment of the present invention.

FIG. 1 is a block diagram showing an example of a general configuration of a clock extracting circuit according to an embodiment of the present invention.

The clock extracting circuit shown in FIG. 1 is provided in, for example, a circuit for receiving NRZ type serial data transmitted in a transmission line, to extract a clock signal in synchronism with the serial data from the serial data. The clock extracting circuit includes: a clock generating circuit 10 for generating a reference clock signal CLK; an oversampling circuit 20 for oversampling input serial data using the reference clock signal CLK; a one-period edge extracting circuit 30 and a two-period edge extracting circuit 40 for detecting a level change point from a signal after oversampling and outputting signals of pulse widths different from each other; a two-period toggle circuit 50 for outputting a signal inverted in polarity at every two periods of the reference clock signal CLK between edges of an output signal of the two-period edge extracting circuit 40; a two-period shift circuit 60 for delaying an output signal of the one-period edge extracting circuit 30; a logical sum circuit 70 for calculating a logical sum of output signals of the two-period toggle circuit 50 and the two-period shift circuit 60; and a one-period shift circuit 80 for delaying the signal after oversampling.

The clock generating circuit 10 includes a PLL circuit for generating a single-phase clock signal. The clock generating circuit 10 generates a reference clock signal CLK having four times a frequency of the inputted serial data, and then supplies the reference clock signal CLK to circuit blocks within the clock extracting circuit. Supposing that a transmission speed of the inputted serial data is 500 Mbps, for example, the frequency of the reference clock signal CLK outputted from the clock generating circuit 10 is 2 GHz.

The oversampling circuit 20 includes D-FF (delay flip-flop) circuits in a plurality of stages connected in series and the like. The oversampling circuit 20 subjects the inputted serial data to four times oversampling using the reference clock signal CLK from the clock generating circuit 10.

The one-period edge extracting circuit 30 and the two-period edge extracting circuit 40 detect a level change point of an output signal from the oversampling circuit 20 and output pulse signals having widths of one period and two periods, respectively, of the reference clock signal CLK.

The two-period toggle circuit 50 outputs a signal inverted in output level at every two periods of the reference clock signal CLK between a falling edge as a starting point and a next rising edge of the output signal from the two-period edge extracting circuit 40.

The two-period shift circuit 60 delays the output signal of the one-period edge extracting circuit 30 by two periods of the reference clock signal CLK. The logical sum circuit 70 calculates a logical sum of the output signals from the two-period toggle circuit 50 and the two-period shift circuit 60 and then outputs the logical sum as an extracted clock signal CLKOUT.

The one-period shift circuit 80 delays the output signal from the oversampling circuit 20 by one period of the reference clock signal CLK and then outputs the result as data DATA corresponding to the extracted clock signal CLKOUT.

The clock extracting circuit performs four times oversampling of the inputted serial data using the single-phase reference clock signal CLK generated by the clock generating circuit 10. It is thereby possible to extract a clock without developing the serial data into parallel data and realize the extraction processing by a circuit of a relatively simple configuration. Further, the clock extracting circuit is configured to extract clock timing on the basis of the signal after oversampling in each of a path including the two-period edge extracting circuit 40 and the two-period toggle circuit 50 and a path including the one-period edge extracting circuit 30 and the two-period shift circuit 60 and correct the clock timing by obtaining a logical sum of the output signals from the two-period toggle circuit 50 and the two-period shift circuit 60. It is thereby possible to improve the accuracy of the clock extraction using the simple circuit.

Next, a description will be made of a concrete example of a circuit configuration of the main circuit blocks in the clock extracting circuit. First, FIG. 2 is a diagram showing an example of a circuit configuration of the one-period edge extracting circuit 30.

Figure 2:
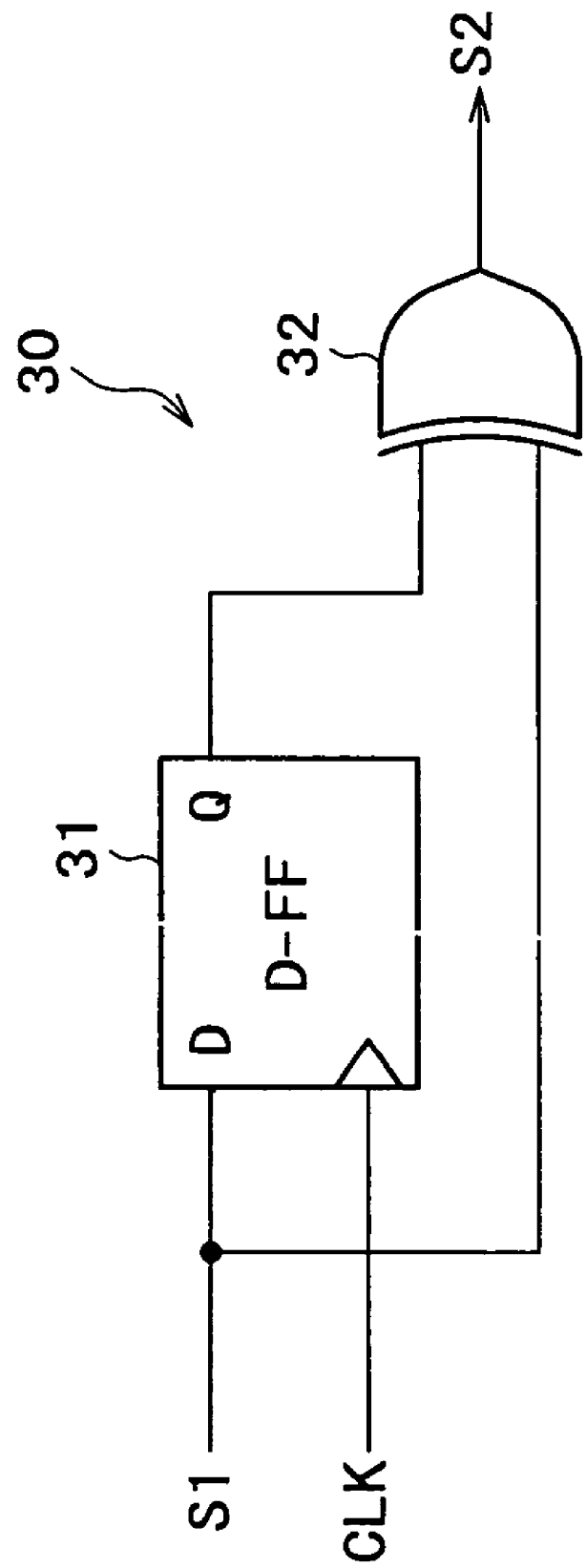
FIG. 2 is a diagram showing an example of a circuit configuration of a one-period edge extracting circuit.

As shown in FIG. 2, the one-period edge extracting circuit 30 includes a D-FF 31 and an XOR (exclusive disjunction) gate 32. The D-FF 31 operates on the basis of the reference clock signal CLK from the clock generating circuit 10 and delays the signal S1 from the oversampling circuit 20 by one period of the reference clock signal CLK. An output signal of the D-FF 31 and the signal S1 from the oversampling circuit 20 are inputted to the XOR gate 32.

A phase difference of one period of the reference clock signal CLK occurs between the signals inputted to the XOR gate 32. Thus, by obtaining an exclusive disjunction of these signals, the XOR gate 32 outputs a pulse signal having a pulse width corresponding to the phase difference of one period of the reference clock signal CLK, with a rising edge and a falling edge of the signal S1 as a starting point of the pulse signal.

Figure 3:
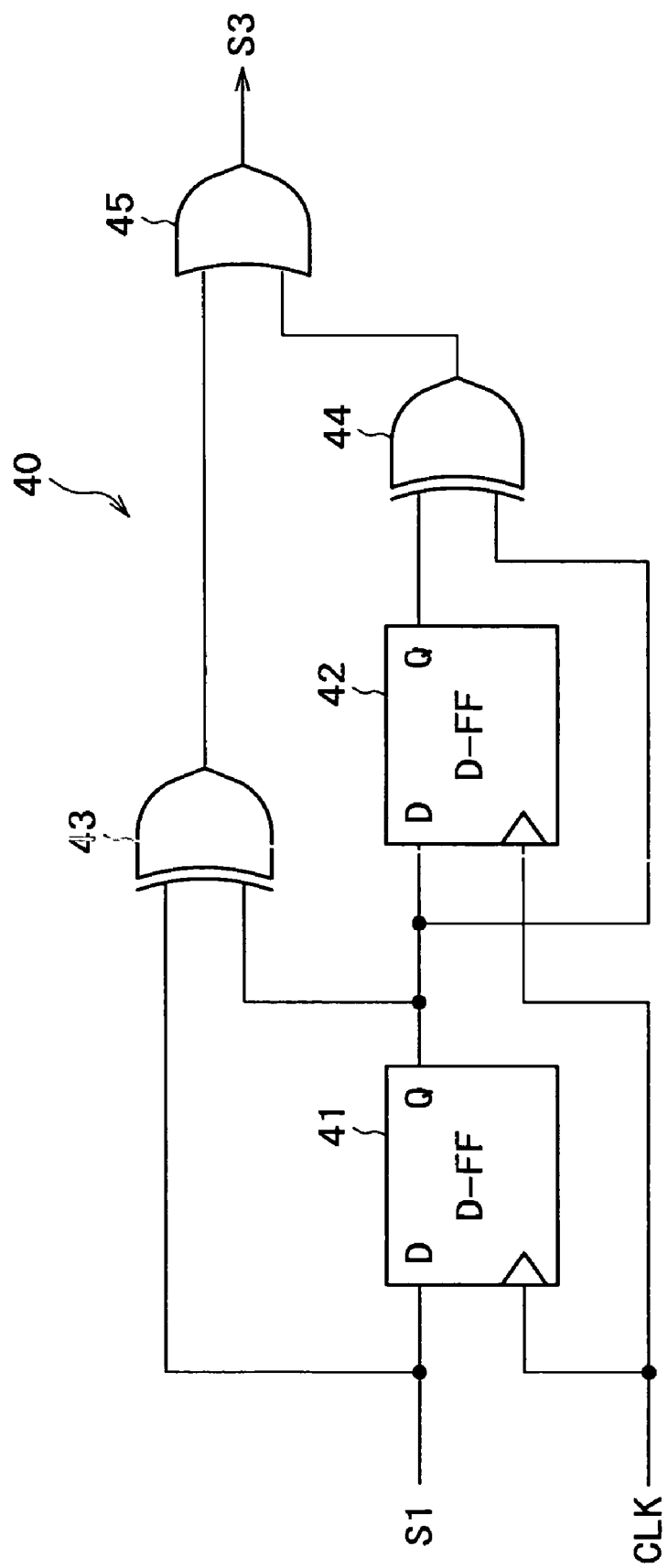
FIG. 3 is a diagram showing an example of a circuit configuration of a two-period edge extracting circuit.

Next, FIG. 3 is a diagram showing an example of a circuit configuration of the two-period edge extracting circuit 40.

As shown in FIG. 3, the two-period edge extracting circuit 40 includes D-FF 41 and 42, XOR gates 43 and 44, and an OR (logical sum) gate 45. The two-period edge extracting circuit 40 is configured to obtain a logical sum of outputs of one-period edge extracting circuits in two stages.

Specifically, the one-period edge extracting circuit in the first stage including the D-FF 41 and the XOR gate 43 outputs a pulse signal having a pulse width of one period of the reference clock signal CLK from a rising edge and a falling edge of the signal S1 after oversampling. The one-period edge extracting circuit in the second stage including the D-FF 42 and the XOR gate 44 operates similarly in response to a signal delayed by one period of the reference clock signal CLK by the D-FF 41. The one-period edge extracting circuit in the second stage, therefore, outputs a signal delayed by one period with respect to the pulse signal from the XOR gate 43. Thus, the OR gate 45 outputs a pulse signal having a pulse width of two periods of the reference clock signal CLK from each edge of the signal S1.

Figure 4:
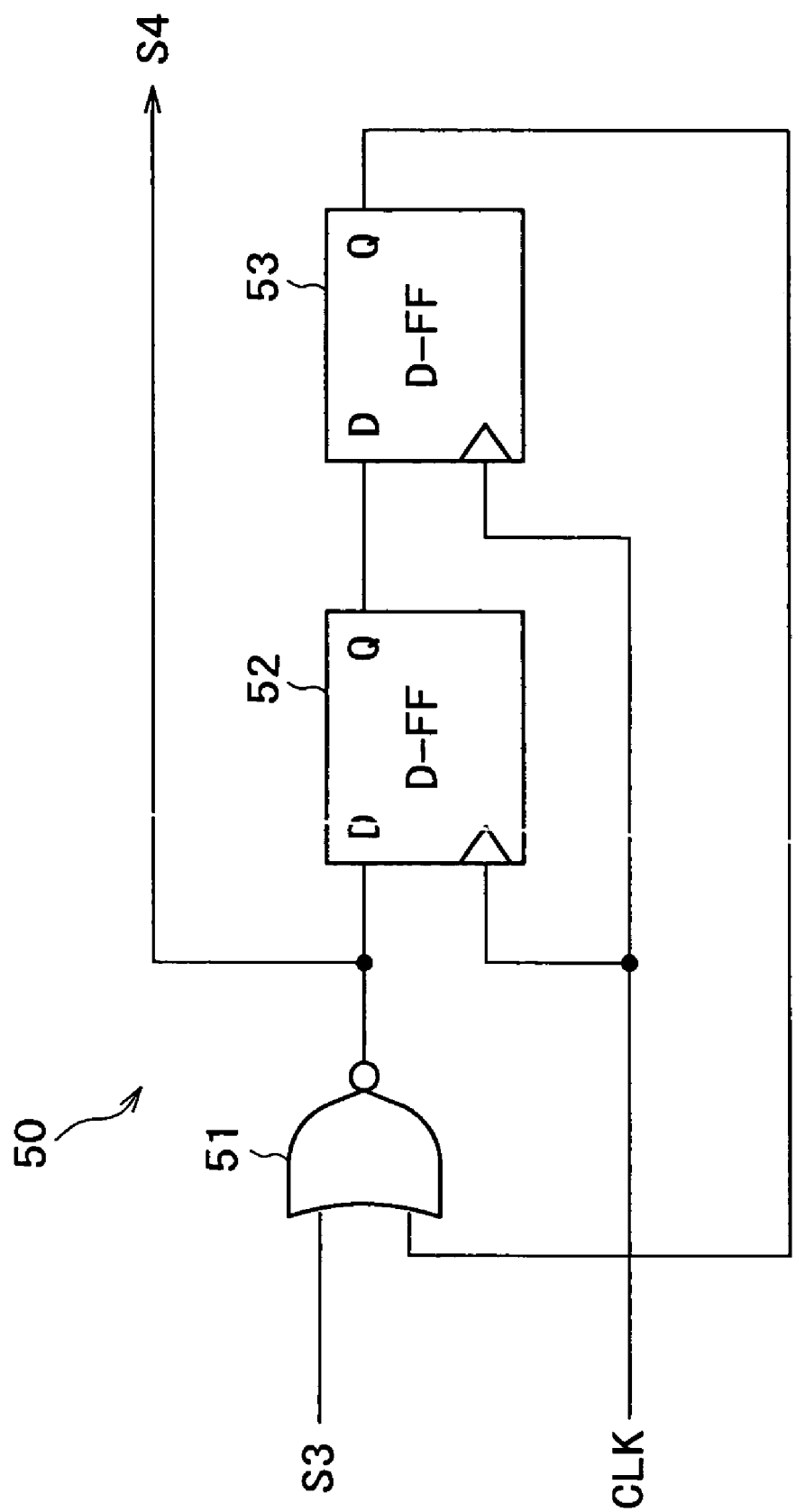
FIG. 4 is a diagram showing an example of a circuit configuration of a two-period toggle circuit.
Figure 6:
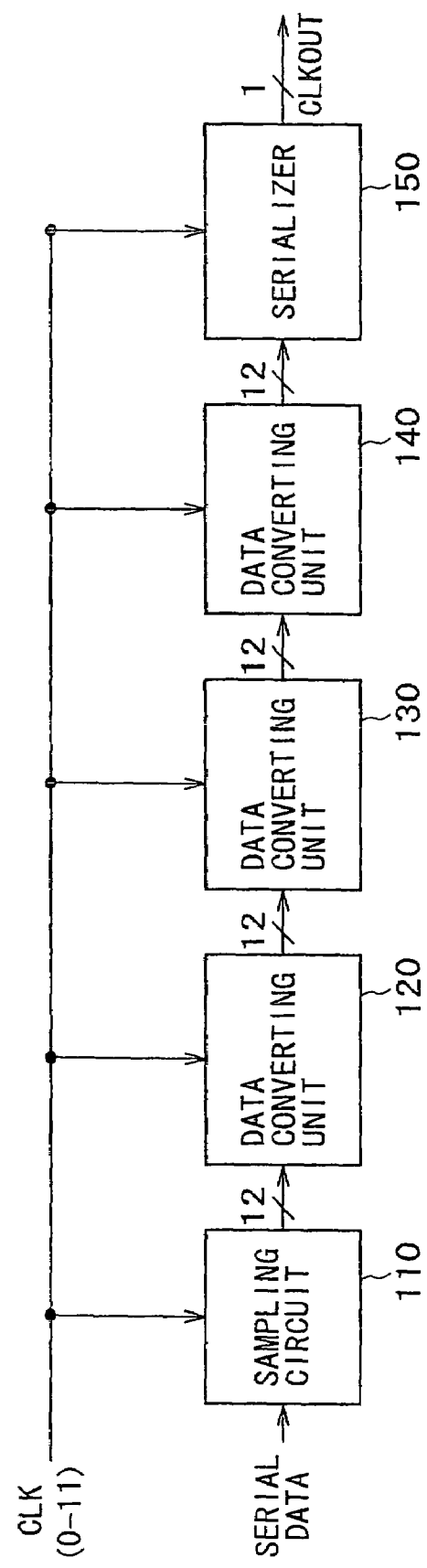
FIG. 6 is a diagram showing an example of a configuration of a conventional clock extracting device.

Next, FIG. 4 is a diagram showing an example of a circuit configuration of the two-period toggle circuit 50.

As shown in FIG. 4, the two-period toggle circuit 50 includes a NOR (non-disjunction) gate 51 and D-FF 52 and 53. An output signal of the NOR gate 51 is outputted to the outside and also inputted to the D-FF 52. An output signal of the D-FF 52 is inputted to the D-FF 53. The signal S3 from the two-period edge extracting circuit 40 is inputted to one input terminal of the NOR gate 51, and an output signal of the D-FF 53 is fed back to another input terminal of the NOR gate 51.

The two-period toggle circuit 50 maintains the output signal of the NOR gate 51 at a L level while the inputted signal S3 is at an H level. The output signal of the NOR gate 51 is delayed by two periods of the reference clock signal CLK by the D-FF 52 and 53 in two stages, and the delayed signal is fed back to the NOR gate 51. Hence, when an H-level signal is outputted from the NOR gate 51 at a time of the signal S3 being at a L level, the H-level signal is inputted to the NOR gate 51 again after two periods, so that the output of the NOR gate 51 is changed to the L level. The L-level signal outputted at this time is inputted to the NOR gate 51 after another two periods, so that the output of the NOR gate 51 is changed to the H level.

Thus, the two-period toggle circuit 50 outputs a signal S4 inverted in output level alternately at every two periods of the reference clock signal CLK between a falling edge and a next rising edge of the signal S3.

Incidentally, the two-period shift circuit 60 and the one-period shift circuit 80 are realized by, for example, connecting D-FF circuits corresponding in number to respective amounts of delay in series with each other.

FIG. 5 is a timing chart showing waveforms of the output signals from parts within the clock extracting circuit. The operation of the clock extracting circuit will be described below with reference to FIG. 5.

FIG. 5 shows examples of waveforms in a case where the inputted serial data includes jitter. Referring to the signal S1 after oversampling of data received during a period from timing T501 to timing T506, output times of a second piece of data "1," a third piece of data "0," and a fifth piece of data "0" are shorter than a correct data period, or four periods of the reference clock signal CLK.

A description will first be made of clock timing extracted in the first path including the two-period edge extracting circuit 40 and the two-period toggle circuit 50. The main function of the first path is to extract clock timing while the input signal continues the same output level.

The signal S3 from the two-period edge extracting circuit 40 has a pulse width of two periods of the reference clock signal CLK, with each of rising edges and falling edges of the signal S1 after oversampling as a starting point of the signal S3. The two-period toggle circuit 50 inverts the output level at every two periods of the reference clock signal CLK with a falling edge of the signal S3 from the two-period edge extracting circuit 40 as a starting point. The signal S4 is set to an H level at every four periods and therefore provides clock timing in synchronism with the data while the signal S3 is at a L level.

During the period from timing T501 to timing T504, for example, while the signal S1 remains at an H level, the signal S4 is set to the H level in timing T502 two periods after a rising edge of the signal S1 and is set to the H level again in timing T503 four periods after timing T502. Clock timing is thus extracted even though no edge occurs in the original signal S1.

The two-period edge extracting circuit 40 outputs an edge of the signal S1 in the form of a pulse signal having a width of two periods. Therefore, even when a period of data is reduced by one period of the reference clock signal CLK to a three-period width as a result of jitter, the two-period edge extracting circuit 40 can extract rising and falling edges, that is, clock timing from the original signal S1. However, when the data period is two periods of the reference clock signal CLK or less, as in the case of a period from timing T504 to timing T505 in FIG. 5, no level change occurs in the signal S3, so that the two-period edge extracting circuit 40 cannot extract clock timing of this period.

Accordingly, the second path including the one-period edge extracting circuit 30 and the two-period shift circuit 60 is used to correct such omission in the extraction of clock timing. As shown in FIG. 5, with the signal S2 from the one-period edge extracting circuit 30, all edges including an edge in timing T505 are extracted from the original signal S1. Since the clock timing extracted by the signal S4 from the two-period toggle circuit 50 is delayed by two periods of the reference clock signal CLK with respect to the original signal S1, the signal S2 from the one-period edge extracting circuit 30 is delayed by two periods by the two-period shift circuit 60, so as to correspond to this amount of delay, and is then supplied to the logical sum circuit 70.

The signals S4 and S5 outputted after going through the first path and the second path as described above are passed through the logical sum circuit 70, whereby a clock signal CLKOUT including all the clock timing extracted in each of the paths is outputted. With the clock signal CLKOUT, as shown in FIG. 5, clock timing synchronous with data periods of the outputted data DATA is extracted without omission.

The one-period shift circuit 80 delays the signal S1 after oversampling by one period of the reference clock signal CLK and outputs the result as the data DATA corresponding to the extracted clock signal CLKOUT. Thereby a margin can be secured for accurately latching the data DATA using the clock signal CLKOUT in a latch circuit provided in a stage succeeding the clock extracting circuit. The clock periods of the outputted clock signal CLKOUT are in practice corrected by using a buffer memory or the like provided in a succeeding stage.

The clock extracting circuit described above interpolates the signal S5 from the second path in the clock timing extracted by the signal S4 from the first path. The clock extracting circuit can thereby perform accurate clock extraction without omission. Further, since such clock extraction with high accuracy is performed by simple processing by the one-period edge extracting circuit 30, the two-period edge extracting circuit 40, the two-period toggle circuit 50, the two-period shift circuit 60, and the logical sum circuit 70 without converting the serial data into parallel data, the clock extracting circuit is readily applicable to data transmitted at higher speeds without an increase in circuit scale, and also an increase in power consumption is prevented.

It is to be noted that while in the foregoing embodiment a description has been made of an example when the inputted serial data is subjected to oversampling at a quadruple sampling frequency, the present invention is also applicable to oversampling at other multiples. However, an output pulse width, an amount of delay, a toggle period and the like need to be set in the circuit blocks in the succeeding stages according to a multiple of oversampling.

Specifically, a period corresponding with the above multiple of the period of the reference clock signal CLK needs to be generated in the first path so as to synchronize with the inputted serial data. When a toggle circuit (corresponding to the two-period toggle circuit 50) is used as in the foregoing embodiment, a period of data inversion in the toggle circuit is ½ of the multiple. The inversion period of the toggle circuit and a pulse width at a time of extraction of an edge in the preceding stage (corresponding to the two-period edge extracting circuit 40) are the same, that is, ½ of the multiple. Thus, the oversampling multiple needs to be four or more and a multiple of two.

Letting 2N (where N is an integer of two or more) be this multiple, it suffices to set the amount of delay in a shift circuit (corresponding to the two-period shift circuit 60) for input to the logical sum circuit 70 to an amount corresponding to N sampling periods in the second path and set the amount of delay in a shift circuit (corresponding to the one-period shift circuit 80) for outputting data DATA corresponding to an extracted clock signal CLKOUT to an amount corresponding to (N−1) sampling periods.

As described above, in the clock extracting circuit according to the present invention, after serial data is subjected to oversampling using a reference clock of 2N times the frequency of the serial data, clock timing in a period of time in which the signal level remains unchanged for a long duration is extracted by first timing detecting means. Clock timing based on a point of change in the signal level is extracted by second timing detecting means, and a final clock timing signal is outputted according to these detected timings. Thus, clock timing can be extracted accurately without omission even when the input signal includes jitter. Further, the clock extraction is performed without converting the input signal into parallel data and by simple processing. Thus, a highly accurate clock extracting circuit with a small circuit scale and low power consumption is realized.

While preferred embodiments of the present invention have been described using specific terms, such description is for illustrative purpose only, and it is to be understood that changes and variations may be made without departing from the spirit or scope of the following claims.

What is claimed is:

1. A clock extracting circuit for extracting a clock timing signal synchronous with input NRZ (Non-Return-to-Zero) type serial data from the serial data, said clock extracting circuit comprising:

oversampling means for oversampling said serial data using a reference clock signal of 2N times a frequency of said serial data, where N is an integer of two or more;

first timing detecting means for detecting the timing of 2N periods of said reference clock signal in a period of time in which the level of an output signal from said oversampling means remains unchanged;

second timing detecting means for detecting the timing of change in the level of the output signal from said oversampling means; and clock timing signal outputting means for outputting the clock timing signal according to the timings detected by said first timing detecting means and said second timing detecting means.

2. A clock extracting circuit as claimed in claim 1, wherein said first timing detecting means includes:

first edge detecting means for outputting a pulse signal having a width of N periods of said reference clock signal at a point of change in the level of the output signal from said oversampling means; and toggle means for outputting a signal inverted in polarity alternately at every N periods of said reference clock signal during a period of time from a point in time when the output signal from said first edge detecting means makes a transition from a first level to a second level lower than said first level to a point in time when said output signal of said first edge detecting means makes a next transition from said second level to said first level; and said second timing detecting means includes:

second edge detecting means for outputting a pulse signal having a width of one period of said reference clock signal at the point of change in the level of the output signal from said oversampling means; and delay means for delaying the output signal from said second edge detecting means by N periods of said reference clock signal.

3. A clock extracting circuit as claimed in claim 2, wherein said toggle means outputs said second level when the output signal from said first edge detecting means is at said first level.

4. A clock extracting circuit as claimed in claim 2, wherein said clock timing signal outputting means includes logical calculation means for calculating a logical sum of output signals from said toggle means and said delay means.

5. A clock extracting circuit as claimed in claim 2, further comprising data output means for delaying the output signal from said oversampling means by (N−1) periods of said reference clock signal and outputting the delayed signal as data corresponding to said clock timing signal.

6. A clock extracting circuit as claimed in claim 1, further comprising a phase-locked loop circuit for generating said reference clock signal as a single-phase signal.

7. A clock extracting method for extracting a clock timing signal synchronous with input NRZ (Non-Return-to-Zero) type serial data from the serial data, said clock extracting method comprising the steps of:

oversampling said serial data using a reference clock signal of 2N times a frequency of said serial data, where N is an integer of two or more; and generating the clock timing signal according to the timing of 2N periods of said reference clock signal, said timing being detected in a period of time in which the level of a signal generated by said oversampling remains unchanged, and timing of change in the level of the signal generated by said oversampling.

* * * * *